United States Patent [19]

Jeon et al.

[11] Patent Number: 5,164,820
[45] Date of Patent: Nov. 17, 1992

[54] COMPATIBLE CIRCUIT FOR AUTOMATICALLY CONTROLLING WHITE BALANCE AND BLACK BALANCE AND THE METHOD THEREOF

[75] Inventors: Byeong-kwan Jeon; Young-gu Eom, both of Kyunggi, Rep. of Korea

[73] Assignee: Samsung Electronics Co., Ltd., Kyungki, Rep. of Korea

[21] Appl. No.: 636,249

[22] Filed: Dec. 31, 1990

[30] Foreign Application Priority Data

Dec. 31, 1989 [KR] Rep. of Korea ............... 20745[U]

[51] Int. Cl.⁵ .............................................. H04N 9/73
[52] U.S. Cl. ................................... 358/29; 358/41
[58] Field of Search .............. 358/29, 29 C, 41, 44, 358/213.16

[56] References Cited

U.S. PATENT DOCUMENTS

| | | | |
|---|---|---|---|
| 3,735,026 | 5/1973 | Smith et al. | 358/29 C |
| 3,786,177 | 1/1974 | Bazin | 358/29 C |
| 4,340,903 | 7/1982 | Tamura | 358/29 C |
| 4,805,010 | 2/1989 | Shroyer et al. | 358/29 C |
| 4,805,011 | 2/1989 | Sase | 358/29 C |
| 4,911,552 | 3/1990 | Kurashige et al. | 358/55 |

Primary Examiner—Edward L. Coles, Sr.
Assistant Examiner—Kim Yen Vu
Attorney, Agent, or Firm—Robert E. Bushnell

[57] ABSTRACT

An apparatus and a process for automatically balancing the white portion and the black portion of a video signal, is designed to have a simplified structure as well as to provide a degree of compatibility between the white portion and the black portion. A color signal processor for variably processing selected color signals of the video signals, a first comparator device responsive to the first selected color signals for providing an automatic white balance signal, a second comparator device responsive to the second selected color signals for providing an automatic black balance signal, and a controller responsive to the automatic white balance signal and the automatic black balance signal for balancing the whiteness level and the blackness level of the video signals in dependence upon reception of a user's command signal representative of either the balancing of the whiteness level or the balancing of the blackness level and a vertical synchronizing signal. The process contemplates a key check sequence, an automatic white balance control sequence, an automatic black balance control sequence, and an information output sequence.

15 Claims, 9 Drawing Sheets

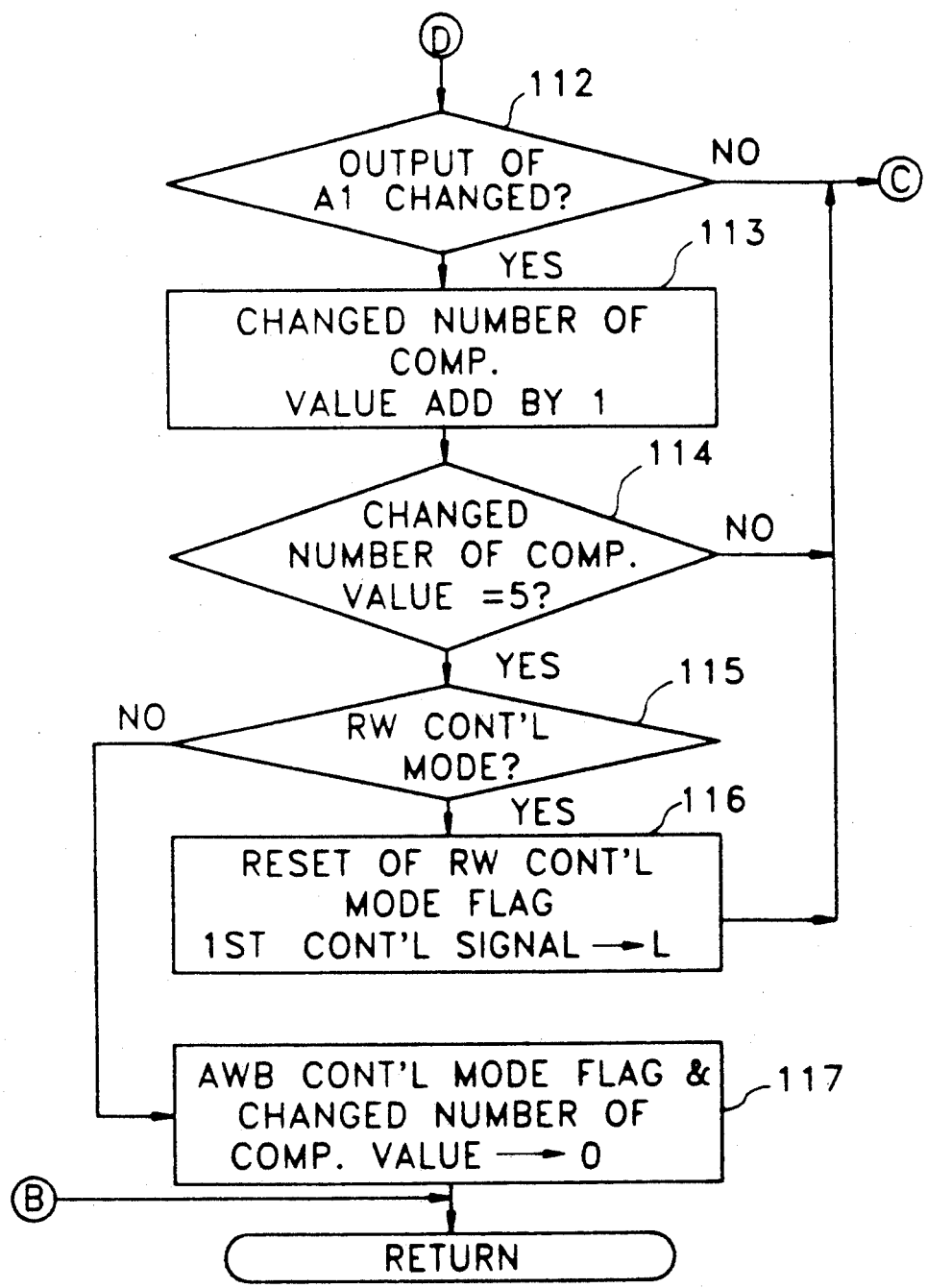

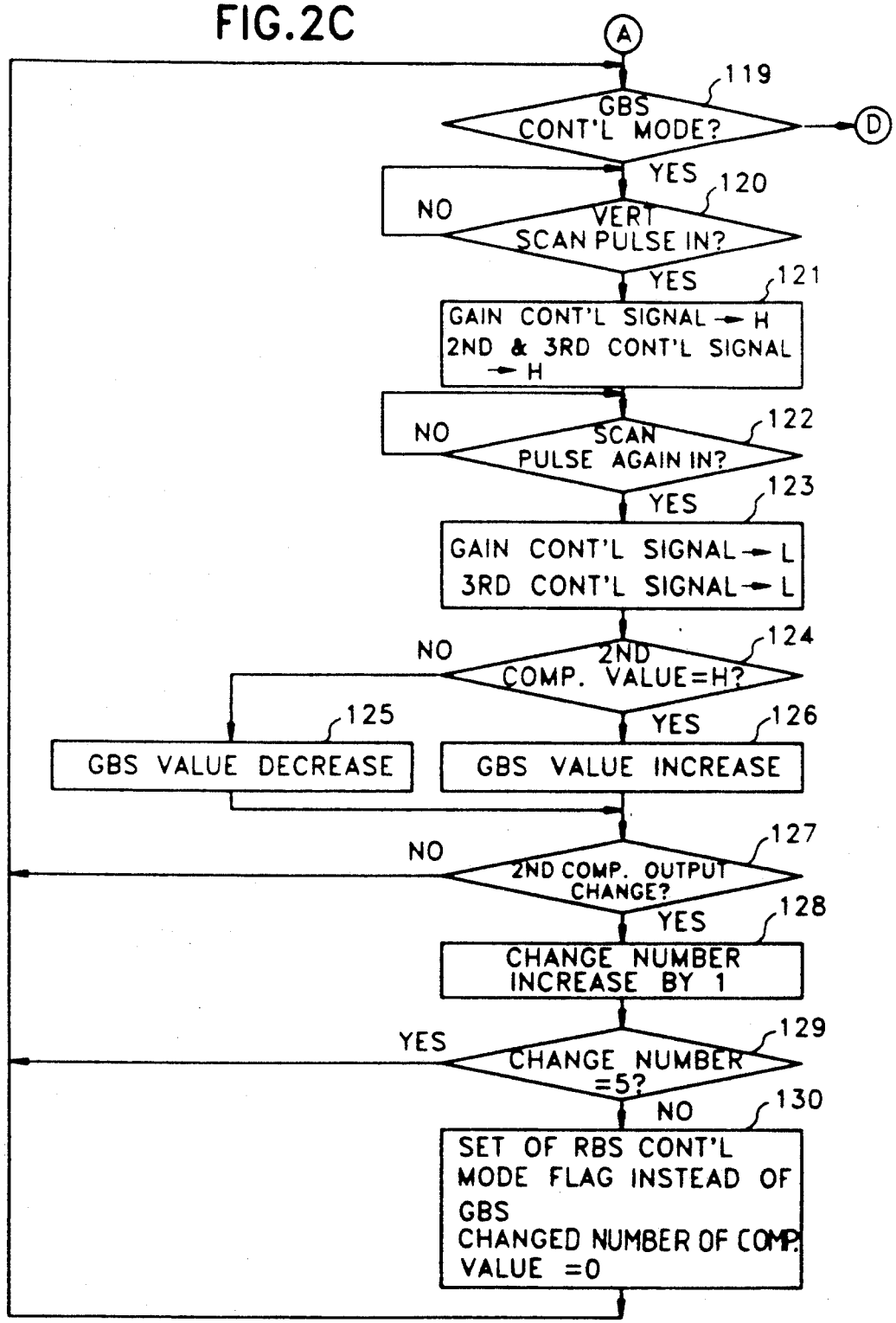

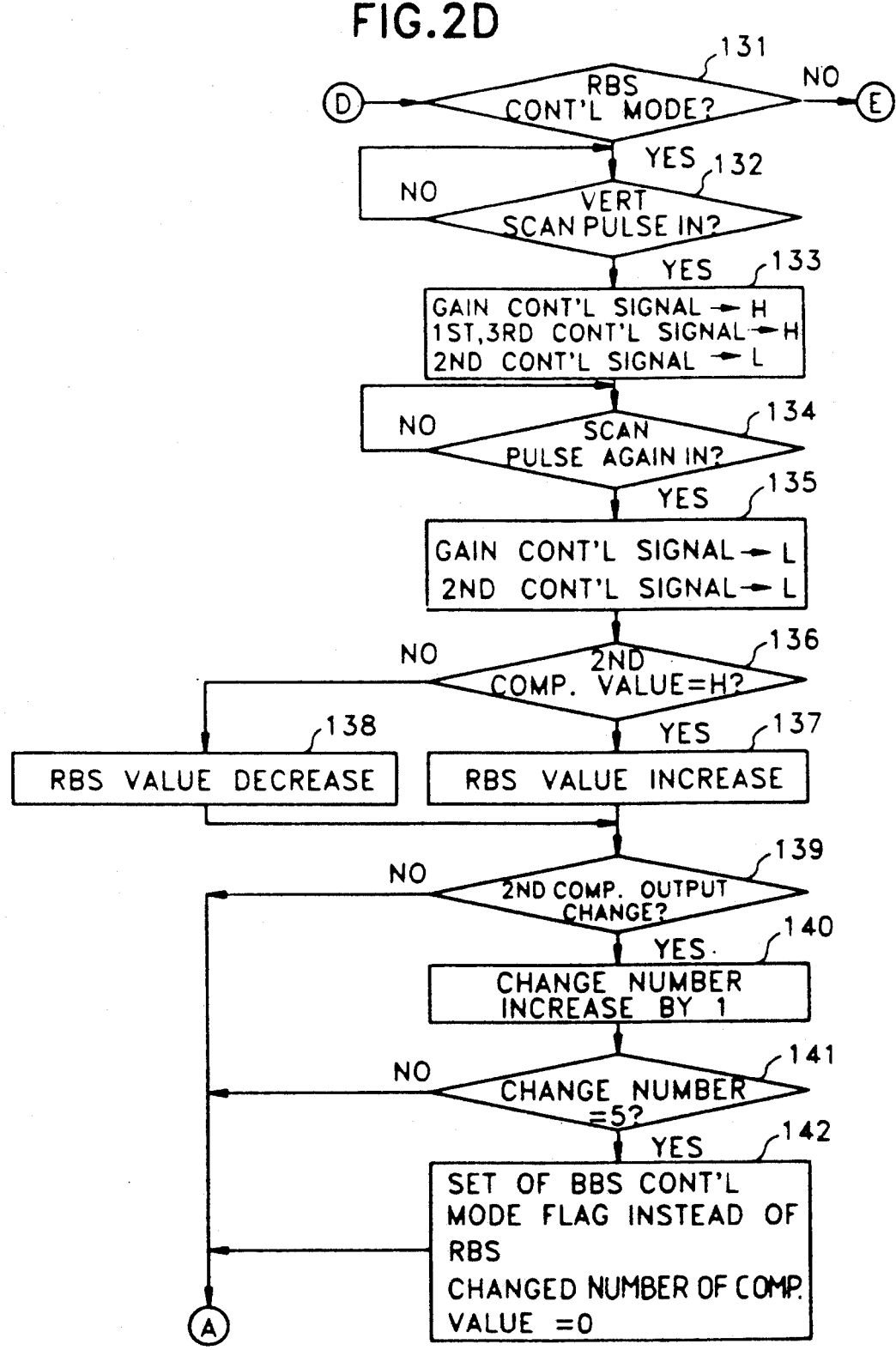

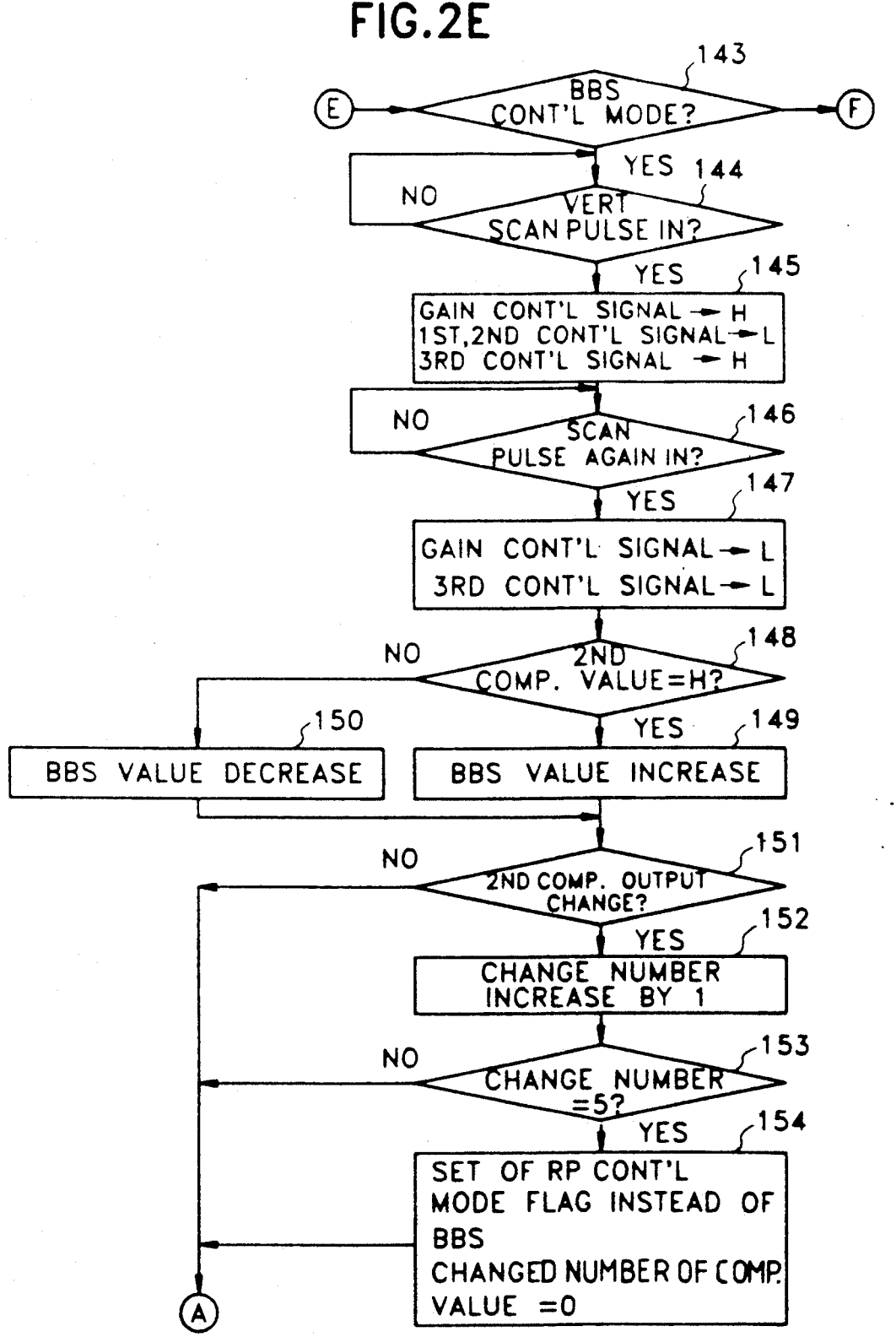

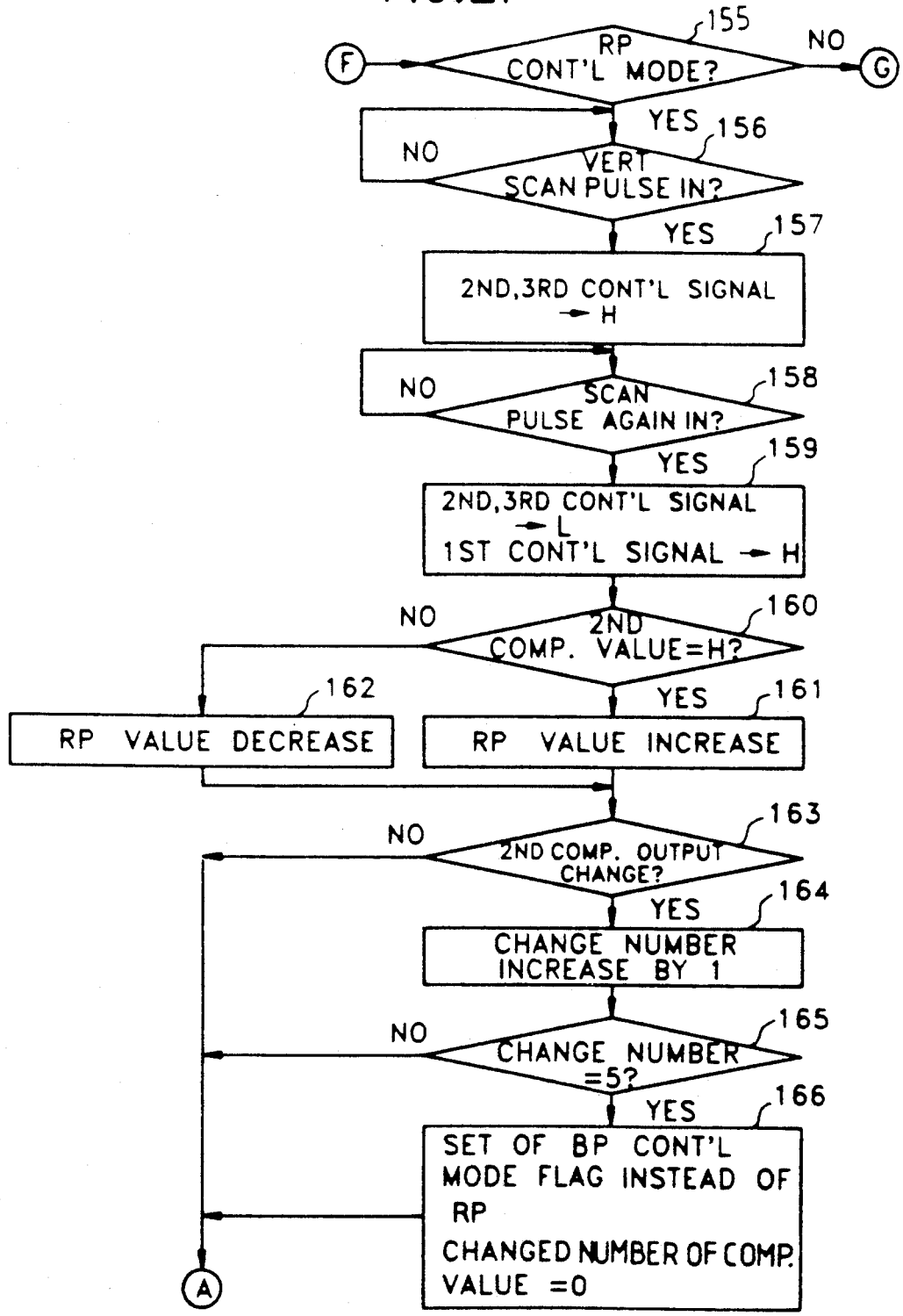

COMPATIBLE CIRCUIT FOR AUTOMATICALLY CONTROLLING WHITE BALANCE AND BLACK BALANCE AND THE METHOD THEREOF

FIELD OF THE INVENTION

The present invention relates to a circuit for automatically controlling the level balance of color signals and the method thereof, to prevent the deterioration of the picture quality based on the condition of the light shining on an object to be photographed and the ambient temperature.

BACKGROUND OF THE INVENTION

In general, the video camera is an apparatus for converting an optical image of an object to a video signal into an electric signal, The video signals in the form of electric signals include a green color (hereinafter, referred to as "G") signal, a red color (hereinafter referred to as "R") signal, and a blue color (hereinafter, referred to as "B") signal, of three primary colors, and the three primary color signals are signals separated by a prism and converted into electric signals by an image pick-up tube. The three primary color signals lose a balance of the white color display level (hereinafter, referred to as "white level") on a screen according to the lighting condition, so that the color is not correctly reproduced. To automatically control the unbalanced white level of the three primary colors, according to the lighting condition of the object to be photographed, is called an auto-white balance (hereinafter, referred to as "AWB") control.

Also, the three primary color signals include dark current which is varied according to the circuit characteristic. The variation of the dark current changes the reference level (hereinafter, referred to as "pedestal level") of the three primary color signals for representing the level of a state which is not picked-up on the screen, and breaks the pedestal level balance of the three primary color signals. It is called an auto-black balance (hereinafter, referred to as "ABB") control that the pedestal level balance broken by the ambient temperature is automatically controlled.

Basically, the AWB control and the ABB control are used in a same way in that the level balance of the three primary colors is controlled by a comparing operation. But, since the ABB control is used for controlling an average value of G signals to be equal to an average value of R and B signals with an optical signal; and the AWB control is used for controlling the average value of the G signals to be equal to an average value of R and B signals with an optical signal. The AWB circuit and the ABB circuits are separately constituted as described above. Each of the AWB circuit and the ABB circuit includes two comparators to usually compare a G signal with a R signal or with a B signal, respectively, or include a comparator to sequentially compare a G signal with a B signal and a R signal, and an A-D converter for analog to digital (hereinafter, referred to as "A-D") converting of a G signal.

Recently, in case of the ABB control, the black set is also carried out in the step in which the pedestal level balance is controlled by the color signals. Accordingly, the compatibility of the AWB circuit and the ABB circuit becomes even more difficult. As a reference, the black set indicates that the pedestal level of the color signals at the normal state is controlled to be equal to the pedestal level of the color signals at the gain increasing time. This creates a problem in that the pedestal levels at the normal time and at the time when the gain of 18 dB is increased, are equal to each other because these levels are closely related. Thus, since the recent ABB circuit controls the pedestal level balance of color signals after the completion of the black set control, the comprising detector for controlling the black set and the comparing detector for controlling the pedestal level balance of the color signals are separately constituted.

In conclusion, the conventional ABB circuit and the conventional AWB circuit can not be used compatibly; and each of these circuits is very complicated to construct.

SUMMARY OF THE INVENTION

It is an object of the present invention to provide a compatible circuit in a video camera for automatically controlling the auto-white balance and the auto-black balance and the method thereof, in which the level balance of color signals for the white color and the black color are automatically and compatibly carried out.

To achieve the above object, according to one aspect of the present invention, there is provided a compatible circuit for automatically controlling automatic white balance and automatic black balance including:
- a controller for controlling video signals;
- a color signal processor for variably amplifying the color signals under the control of the controller, and processing the color signals;
- first comparing device for comparing the color signals processed in the color signal processor to control AWB;
- second comparing device for comparing the color signals processed in the color signal processor to control ABB;
- transmitter for selectively supplying the color signals processed handled in the color signal processor under the control of the controller to the first and second comparing device, and selectively transmitting outputs of the first and second comparing device to the controller;
- output device for supplying control data processed in the controller to the color signal processor;
- key input device for transmitting user's defined direction to the controller; and
- a vertical synchronizing signal generator for supplying a vertical synchronizing signal to the controller.

To achieve the above object, according to another aspect of the present invention, there is provided a method for automatically controlling automatic white balance and automatic black balance including:
- a key check sequence for checking whether the user requires an AWB control or an ABB control;
- an AWB control sequence for controlling the white level balance of color signals by detecting the level difference between color signals every other vertical synchronizing period when the AWB control is required in the key check sequence;
- an ABB control sequence for controlling the black set value of each color signal by reading a difference between the pedestal levels at the normal time and at the gain increasing time every other vertical synchronizing period, and controlling the pedestal level balance of color signals by reading the pedestal level difference of color signals every other vertical synchronizing period, when the ABB control is required in the key check sequence; and an information output sequence for producing the control data processed at every other vertical synchronizing period in the AWB control sequence and the ABB control sequence, every vertical synchronizing period.

BRIEF DESCRIPTION OF THE DRAWINGS

The above object and other advantages of the present invention will become more apparent by describing the preferred embodiment of the present invention with reference to the attached drawings, in which:

FIGS. 2A-2H show flow charts of the preferred embodiment according to the present invention.

DETAILED DESCRIPTION OF THE INVENTION

Figure 1:
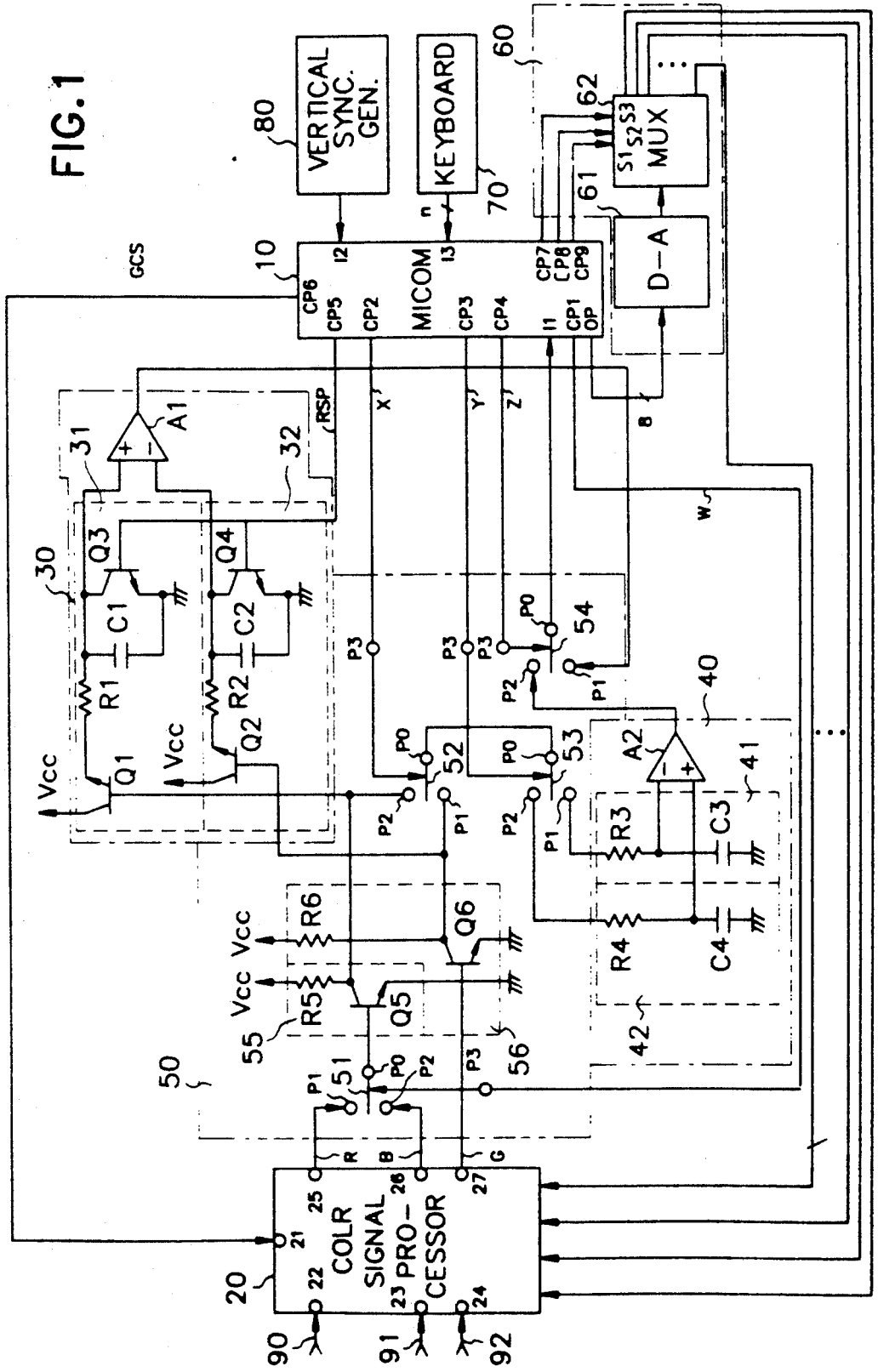
FIG. 1 is a circuit diagram of a preferred embodiment according to the present invention.

FIG. 1 is a circuit diagram for an auto-white balance and auto-black balance control according to the present invention. In FIG. 1, first to third input terminals 90 to 92 are connected to an image pick-up tube to receive R, G, and B color signals, and are also connected to first to third input terminals of color signal processor 20, respectively. The first and second input terminals of the color signal processor 20 are correspondingly connected to both selection contacts P1 and P2 of a first control switch 51, respectively. A third output terminal of color signal processor 20 is connected to an input terminal of a second buffer device 56 composed of a transistor Q6 and a resistor R6. A reference contact P0 of the first control switch 51 is connected to an input terminal of a first buffer device 55 composed of a transistor Q5 and a resistor R5. An output terminal of the first buffer device 55 is connected to an input terminal of first sampling device 31 composed to two transistors Q1 and Q3, a resistor R1, and a capacitor C1, and also to a selection contact P2 of second control switch 52. An output terminal of the second buffer device 56 is connected to an input terminal of a second sampling device 32 composed of two transistors Q2 and Q4, a resistor R2, and a capacitor C2, and also to a second selection contact P1 of the second control switch 52. An output terminal of the first sampling device 31 is connected to an non-inverted input terminal of a first comparator A1. An output terminal of the second sampling device 32 is connected to an inverted input terminal of the first comparator A1. A reference contact P0 of the second control switch 52 is connected to a reference contact P0 of a third control switch 53. Both selection contacts P1 and P2 of the third control switch 53 are connected to an input terminal of a first integrator 41 composed of a resistor R3 and a capacitor C3, and an input terminal of a second integrator 42 composed of a resistor R4 and a capacitor C4, respectively. Output terminals of the first and second integrators 41 and 42 are correspondingly connected to non-inverted input terminal and an inverted input terminal of a second comparator A2, respectively. Output terminals of the first and second comparators A1 and A2 are correspondingly connected to first selection contacts P1 and P2 of a fourth control switch 54, respectively. A reference contact P0 of the fourth control switch 54 is connected to an input terminal I1 of a microcomputer (hereinafter, referred to as "MICOM") used as a controller. Control terminals P3 of the first to fourth control switches 51 to 54 are correspondingly connected to first to fourth control terminals CP1 to CP4 of the MICOM 10, respectively. Control terminals of the first and second sampling device 31 and 32 are commonly connected to a fifth control terminal CP5 of the MICOM 10. A control terminal of a color amplifier 21 included in the color signal processor 20 is connected to a sixth control terminal CP6 of the MICOM 10. An output terminal of a keyboard 70 used as a key input device is connected to a third input terminal I3 of the MICOM 10. An output terminal of a vertical synchronizing signal generator 80 is connected to a second input terminal I2 of the MICOM 10. An input port of a D-A converter 61 is connected to an output port OP of the MICOM 10. An input terminal of a multiplexer 62 is connected to an output terminal of the D-A converter 61. And, first to third selection terminals of the multiplexer 62 are connected to seventh to ninth control terminals CP7 to CP9 of the MICOM 10. Also, an output port of the multiplexer 62 is connected to a control port of the color signal processor 20.

In the operation of the circuit shown in FIG. 1, the color signal processor 20 processes R, G and B signals received through the first to third input terminals 90 to 92 in response to control data supplied from the multiplexer 62 to the control port, and supplies the processed signals via the first to third output terminals. The color signal processor 20 amplifies color signals at a normal amplification rate, or at an amplification rate greater than the normal amplification gain by 18 dB, according to the logic state of the gain control signal GCS supplied from the sixth control terminal the MICOM 10.

A transit device 50 including the first and second buffers 55 and 56 selectively supplies R and B signal with G signal to the first comparing device 30, and supplies a selected signal of R, G, and B signals to the second comparing device 40, and selectively transmits output of the first comparing device 30 or the second comparing device 40 to the first input terminal I1 of the MICOM 10. In more detail, the first control switch 51 selects R signal on the first selection contact P1 or B signal on the second selection contact P2 according to a logic state of a first control signal W, and supplies the selected signal through the reference contact P0 to the input terminal of the first buffer 55. The first buffer 55 buffers the selected R or B signal by the first control switch 51, and supplies the buffered signal to the input terminal of the first sampling device 31 and the first selection contact P1 of the second control switch 52. The second buffer 56 buffers the G signal received from the third output terminal of the color signal processor 20, and supplies the buffered signal to an input terminal of the second sampling key 32 and the second selection contact P2 of the second control switch 52. The second control switch 52 selects the buffered R or B signal received on the first selection contact P1 or the buffered G signal received on the second selection contact P2, in response to a second control signal X supplied from the second control terminal CP2 of the MICOM 10 and supplies the selected signal through the reference contact P0 to the reference contact P0 of the third control switch 53. The third control switch 53 supplies the R or B signal or the G signal selected by the second control switch 52 through the first selection contact P1 to the input terminal of the first integrator 41 or through the second selection contact P2 to the input terminal of the second integrator 42, according to the logic state of a control signal Y supplied from the third control terminal CP3 of the MICOM 10 to the control terminal. The fourth control switch 54 selects an output of the first comparator A1 fed to the first selection contact P1 or an output of the second comparator A2 fed to the second selection contact P2 according to a logic state of a fourth control signal Z, and supplies the selected signal to the first input terminal I1 of the MICOM 10 through the reference contact P0.

The comparing device 30 composed of two sampling devices 31 and 32 and a first comparator A1 compares G signal with R signal or G signal with B signal supplied through the transit device 50. In more detail, after being initialized by a reset pulse RSP of a high logic state supplied from the fifth control terminal of the MICOM 10 to the reset terminal (i.e., a base of the transistor Q2), the first sampling device 31 stores the buffered R or B signal supplied from the first buffer 55 to the input terminal (i.e., a base of the transistor Q1), and supplies the stored signal to the non-inverted input terminal of the first comparator A1 through the output terminal (i.e., a collector of the transistor Q2). After being initialized by the reset pulse RSP of a high logic state supplied from the fifth control terminal to the reset terminal (i.e., a base of the transistor Q4), the second sampling device 32 stores the buffered G signal supplied from the second buffer 56 to the input terminal (i.e., a base of the transistor Q3), and supplies the stored signal through the output terminal (i.e., a collector of the transistor Q4) to the non-inverted input terminal of the first comparator A1. The first comparator A1 compares the stored R and B signal fed to the non-inverted input terminal of the first comparator A1 with the stored G signal fed to the non-inverted input terminal, and supplies the compared result to the first selection contact P1 of the fourth control switch 54.

The second comparing device 40 compares two different signals which are successively received through the transit device 50. In more detail, the first integrator 41 stores the color signal received through the first selection contact P1 of the third control switch 53, and supplies the accumulated signal to the non-inverted input terminal of the second comparator A2. The second integrator 42 stores the color signal received through the second selection contact P2 of the third control switch 53 of the second integrator 42, and supplies the stored signal to the non-inverted input terminal of the second comparator A2. The second comparator A2 compares the output of the first integrator 41 fed to the inverted input terminal, the output of the first integrator 41 fed to the non-inverted input terminal, and the output of the second integrator 42 fed to the non-inverted input terminal, and supplies the compared result to the second selection contact P2 of the fourth control switch 54.

The MICOM 10 checks the key data received from the keyboard 70. If the key data is an AWB or ABB control direction, the MICOM 10 adjusts logic states of control signals and checks the output logic of the first comparing devices 30 or the second comparing devices 40 in response to the period of the vertical synchronizing signal supplied from the vertical synchronizing signal generator 80, to control the white level balance or the black set value and the pedestal level balance, and supplies the adjusted control data from the output port to the color signal processor 20 through the output device 60 composed of the D-A converter 61 and the multiplexer 62.

The output device 60 converts the control data received from the output port of the MICOM 1 into analog signals, and supplies the converted signals to the corresponding control terminal of the color signal processor 20. In more detail, the D-A converter 61 converts the 8-bit control data received from the output port of the MICOM 10 to the input port into an analog voltage signal, and supplies the converted signal to the input terminal to the multiplexer 62. The multiplexer 62 is used to apply the analog voltage signal fed to the input terminal to a corresponding control terminal of the color signal processor 20 through an output terminal corresponding to a logic value of the selection data supplied to first to third selection terminals S1 to S3 from seventh to ninth control terminal CP7 to CP9 of the MICOM 10.

Figure 2A:
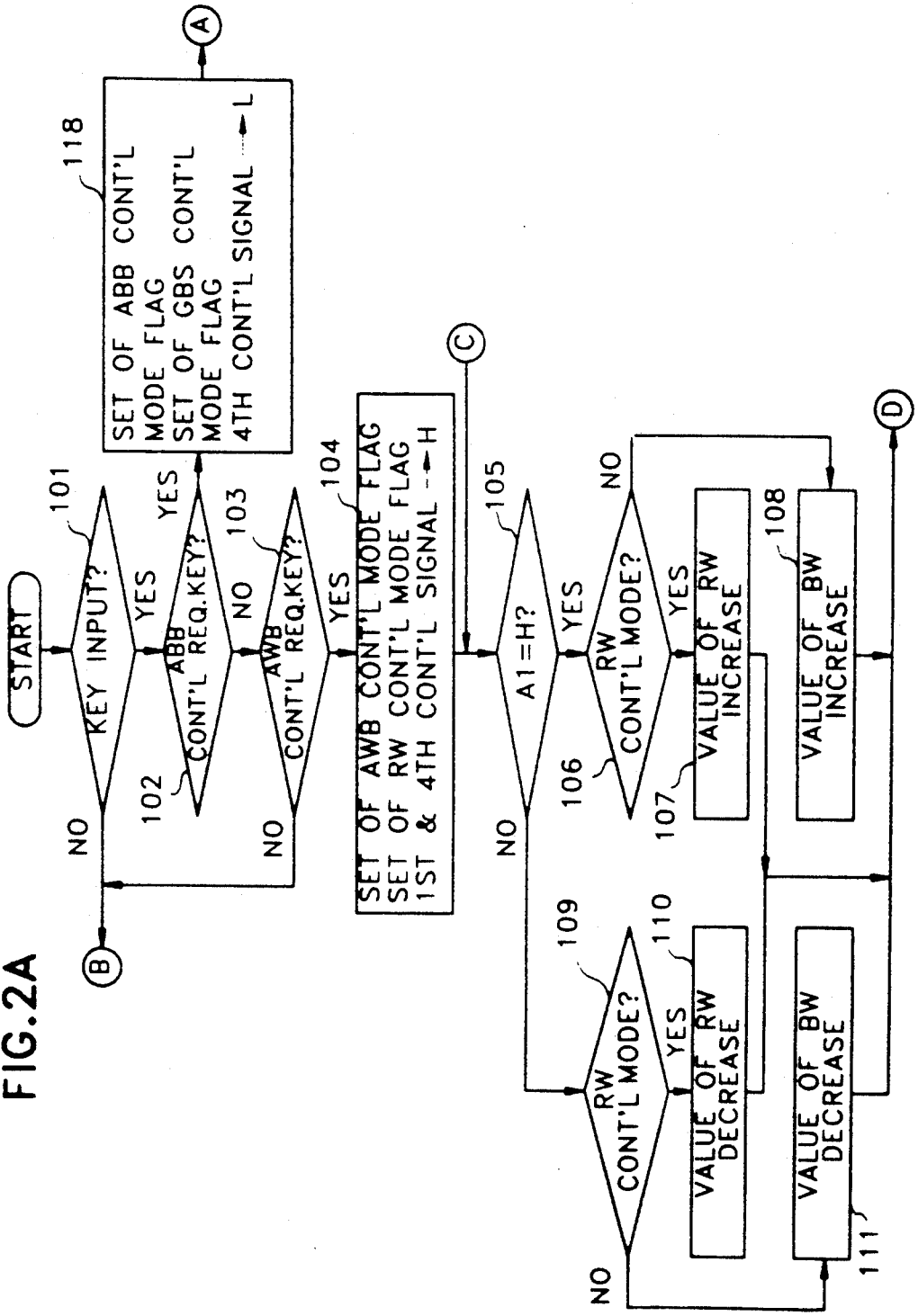
Figure 2G:
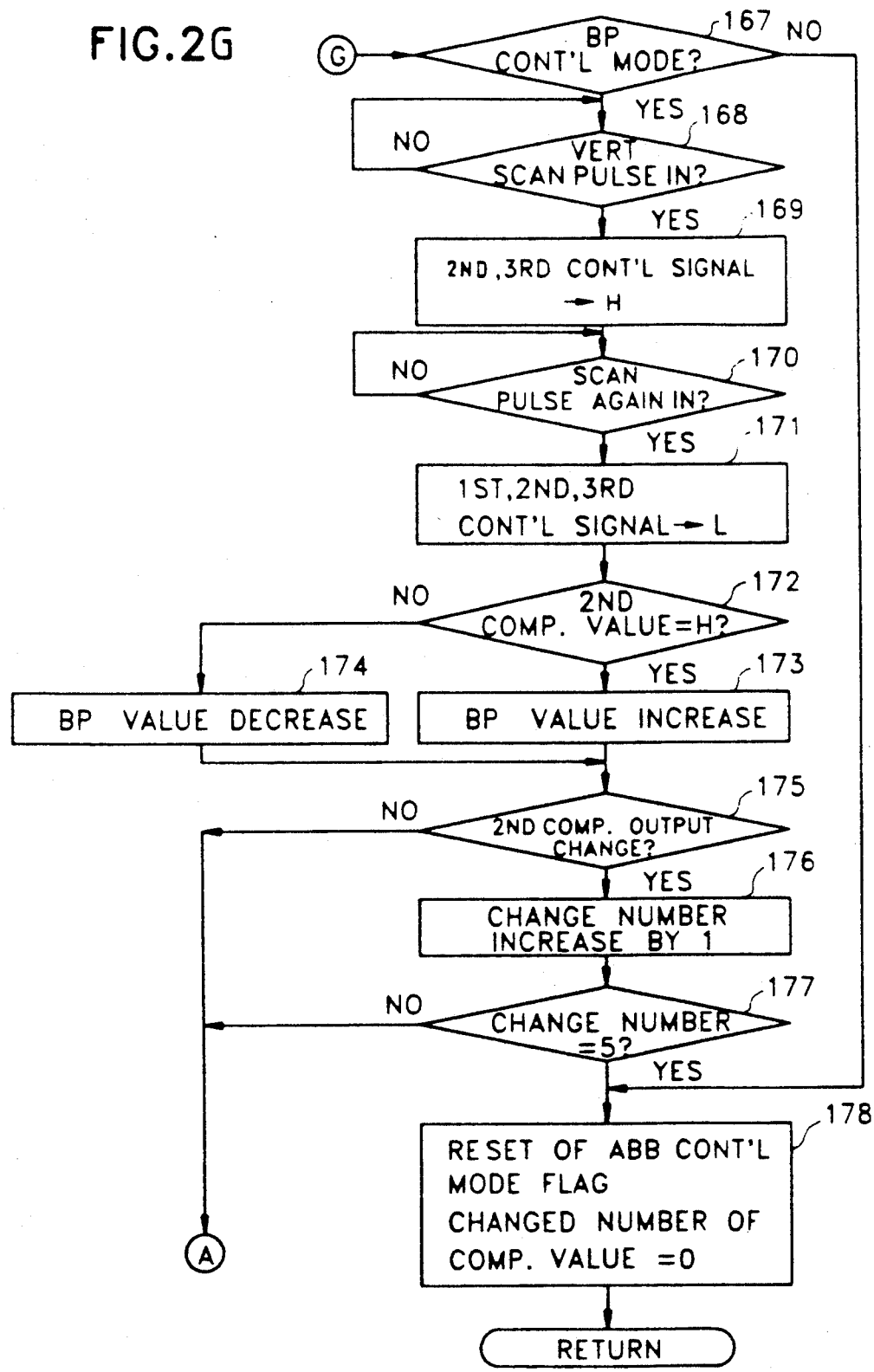
Figure 2H:
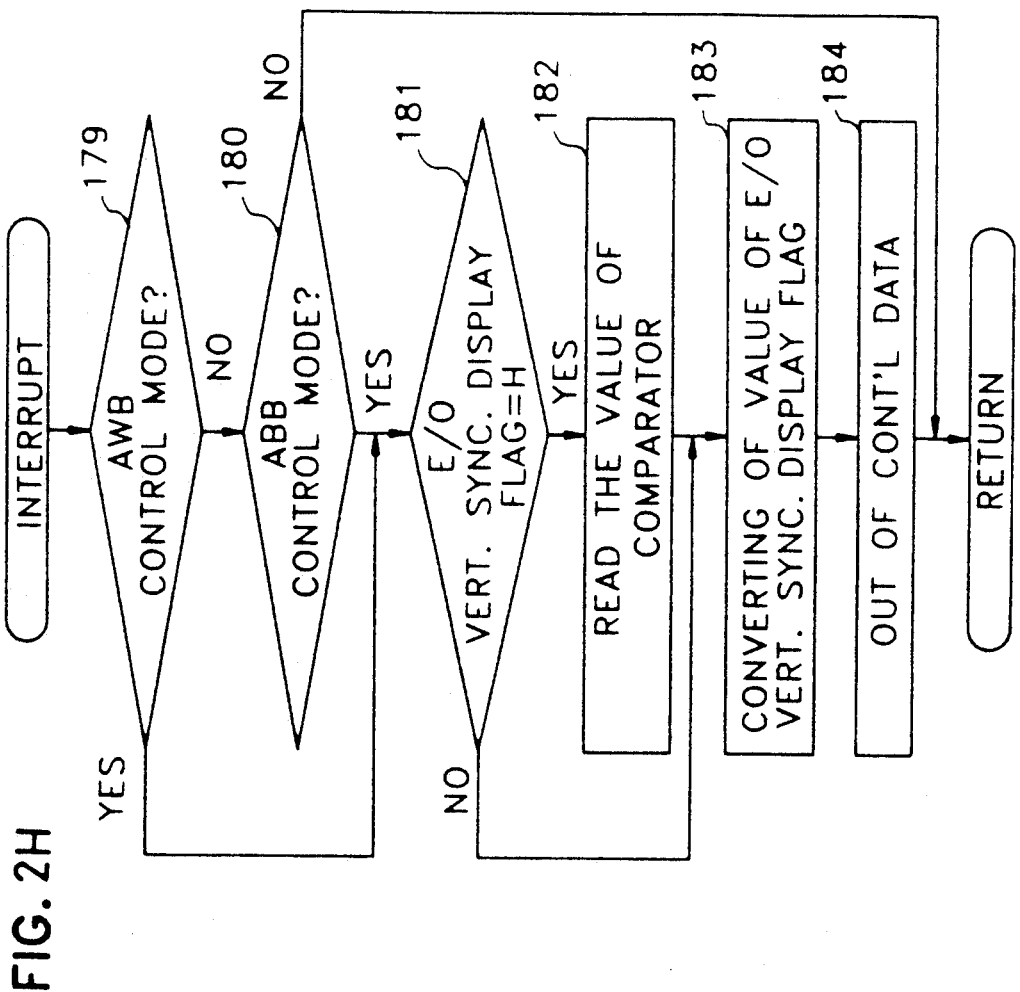

FIG. 2 is a flow chart of a preferred embodiment according to the method of the present invention, in which the MICOM 10 shown in FIG. 1 performs the following sequences. In FIG. 2, steps 101 to 103 correspond to a key check sequence, steps 104 to 117 correspond to an AWB control sequence, steps 118 to 178 correspond to an ABB control sequence, and steps 179 to 184 correspond to an information output sequence.

The flow chart shown in FIG. 2 will be explained in connection with the circuit diagram shown in FIG. 1. The MICOM 10 checks the key data, which has been received from predetermined period and has been stored in its working buffer (step 101).

When the key data is received in the step 101, the MICOM 10 checks the logic value of the received key data to determine if the logic value is an ABB control direction key (step 102).

If the logic value is not an ABB control direction key in the step 102, the MICOM 10 checks the logic value of the received key data to determine if the logic value is an AWB control direction key. If the logic value is not an AWB control direction key, the MICOM 10 is returned to the main routine (step 103).

If the received key data has been determined to be an AWB control direction key in the step 103, the MICOM 10 sets an AWB mode flag allocated in its register to set up an AWB control mode, and sets a R signal white level control mode flag (hereinbefore, referred to as a "RW control mode flag") to set up a R signal control mode, and supplies a first control signal W of a high logic state and a fourth control signal Z of a high logic state through the first and fourth control terminals CP1 and CP4, to make the first control switch 51 select a R signal and make the fourth control switch 54 select an output of the first comparator A1 (step 104). At this time, G and R signals are supplied to the first comparator A1.

After the completion of the step 104, the MICOM 10 checks if the output logic state of the first comparator A1 fed from the first comparator A1 through the fourth control switch 54 and the first input terminal I1 and stored in its working buffer is a high logic state (step 105).

If the output logic state of the first comparator A1 is a high logic state in the step 105, the MICOM 10 checks if the RW control mode flag has been set, to determine whether the RW control mode has been set (step 106).

If the RW control mode flag has been set in the step 106, the MICOM 10 increases the white level of the R signal stored in its Random Access Memory (i.e., RAM) by a predetermined value (step 107).

If the RW control mode flag has not been set in the step 106, the MICOM 10 increases the white level of the B signal stored in its RAM by a predetermined value (step 108).

If the output logic state of the first comparator A1 has not been a high logic state in the step 105, the MICOM 10 checks if the RW control mode flag has been set, in order to determine if the RW control mode has been set (step 109).

If the RW control mode flag has been set in the step 109, the MICOM 10 decreases the white level of signal R stored in its RAM by a predetermined value (step 110).

If the RW control mode flag has not been set in the step 109, the MICOM 10 decreases the white level of the B signal stored in its RAM by a predetermined value (step 111).

After the completion of the step 108 or 107 or the completion of the step 110 or 111, the MICOM 10 checks if the previous output logic state of the first comparator A1 stored in its RAM is equal to the present output logic state of the first comparator A1 received on the working buffer (step 112).

If the previous output logic of the first comparator A1 is different from the present output logic in the step 112, the MICOM 10 adds 1 to the value of the comparator change counter which is allocated in its register (step 113).

After carrying out the step 113, the MICOM 10 checks if the value of the comparator value change counter is a predetermined value of 5 (step 114).

If the value of the comparative value change counter is 5 in the step 114, the MICOM 10 checks if the RW control mode flag has been set (step 115).

If the RW control mode flag has been set in the step 115, the MICOM 10 reset the RW control mode flag, inverts the first control signal W of a high logic state, and supplies the inverted signal through the first control terminal CP1. Also, the MICOM initializes the comparative change counter and then goes back to the step 105 (step 116).

If the RW control mode flag has not been set in the step 115, the MICOM 10 decides the completion of RWB control, initializes the AWB mode flag and the comparative change counter, and then goes back to the main routine (step 117).

If the received key data is determined to be an ABB control direction key in the step 102, the MICOM 10 sets the ABB mode flag allocated in its register to set the ABB control mode, and sets a G signal black set control mode flag (hereinafter, referred to as "GBS control mode flag") allocated on its register to set the G signal black set control mode, and also supplies the fourth control signal Z of a low logic state via the fourth control terminal CP4, so that the fourth control switch 54 selects the output of the second comparator A2 (step 118).

After carrying out the step 118, the MICOM 10 checks if the GBS control mode flag has been set (step 119).

If the GBS control mode flag has been set in the step 119, the MICOM 10 awaits until a vertical scanning pulse representing a vertical scanning period is received from the vertical synchronizing signal generator 80 (step 120).

If a vertical scanning pulse has been received in the step 120, the MICOM 10 supplies a gain control signal GCS of a high logic state via the sixth control terminal CP6 to control color signals, supplied from the color signal processor 20, to be amplified by a 18 dB, and supplies the second and third control signals X and Y of high logic states via the second and third control terminal CP2 and CP3 to control the second and third control switches 52 and 53 to select the first selection contacts P1, respectively.

After carrying out the step 121, the MICOM 10 waits until a vertical scanning pulse is again supplied from the vertical synchronizing signal generator 80 (step 122).

When the vertical scanning pulse is received in the step 122, the MICOM 10 inverts high logic states of the gain control signal GCS and the third control signal Y to low logic states to make color signals, i.e., an output of the color signal processor 20, be a normal gain, and makes the third control switch 53 select the second selection terminal P2 (step 123). At this time, the G signal having a normal gain is fed to a non-inverted input terminal of the second comparator A2 through the second buffer 5, the second and third control switches 52 and 53, and a second integrator 42.

After carrying out the step 123, the MICOM 10 checks if the output logic state of the second comparator A2, received from the second comparator A2 through the fourth control switch 54 and stored in its working buffer, is a high logic state (step 124).

If the output logic state of the second comparator A2 is a high logic state in the step 124, the MICOM 10 increases the G signal black set value (hereinafter, referred to as "GBS value") stored in its RAM by a predetermined level (step 125).

If the output logic state of the second comparator A2 is not a high logic state in the step 124, the MICOM 10 decreases the GBS value by a predetermined level (step 126).

After carrying out the step 125 or 126, the MICOM 10 checks if the previous output logic state of the second comparator A2 stored in its RAM is equal to the present output logic state of the second comparator A2 received on the working buffer (step 127).

If the previous output logic state of the second comparator A2 is different from the present output logic state in the step 127, the MICOM 10 adds 1 to the value of its comparative change counter (step 128).

After carrying out the step 128, the MICOM 10 checks if the value of the comparative value change counter is the predetermined value 5 (step 129).

If the value of the comparative value change counter is 5 in the step 129, the MICOM 10 sets a R signal black set control mode flag (hereinafter, referred to as "RBS control mode flag") instead of the GBS control mode flag to set a R signal black set control mode, and initializes the comparative change counter, and goes back to the step 119 (step 130). And, if the output logic state of the second comparator A2 has not been changed in the step 127 or if the value of the comparative change counter is not 5, the MICOM 10 goes back to the step 119.

If the GBS control mode flag has not been set in the step 119, the MICOM 10 checks if the RBS control mode flag has been set (step 131).

If the RBS control mode flag has not been set in the step 131, the MICOM 10 waits until the vertical scanning pulse representing a vertical scanning term is received from the vertical synchronizing signal generator 80 (step 132).

If the vertical scanning pulse is received in the step 132, the MICOM 10 supplies the gain control signal GCS of a high logic state via the sixth control terminal CP6 to control the color signal supplied from the color signal processor 20 to be amplified by 18 dB higher than that of the normal time, and supplies the first, second and third control signals W, X and Y of high logic states through the first, second, and third control terminals CP1 to CP3 to control the first, second, and third control switches 51, 52 and 53 to select each first selection contact P1 (step 133). At this time, the R signal amplified by 18 dB than that of normal time is received in the non-inverted input terminal of the second comparator A2 through the first control switch 51, the first buffer 55, the second and third control switches 52 and 53, and the first integrator 41.

After carrying out the step 133, the MICOM 10 waits until the vertical scanning pulse is again received from the vertical synchronizing signal generator 80 (step 134).

If the vertical scanning pulse is again received in the step 134, the MICOM 10 inverts high logic states of the gain control signal GCS and the third control signal Y to low logic states to make the color signals, i.e., an output of the color signal processor 20, have normal gain, and the third control switch 53 selects the second selection terminal P2 (step 135). At this time, the R signal having a normal gain is received in the non-inverted input terminal of the second comparator A2 through one first control switch 51, the first buffer 55, the second and third control switches 52 and 53, and the second integrator 42.

After carrying out the step 135, the MICOM 10 checks if the output logic state of the second comparator A2 received from the second comparator A2 through the fourth control switch and stored in its working buffer is a high logic state (step 136).

If the output logic state of the second comparator A2 is a high logic state in the step 136, the MICOM 10 increases the R signal black set value (hereinafter, referred to as "RBS value") stored in its RAM by a predetermined level (step 137).

If the output logic state of the second comparator A2 is not a high logic state in the step 124, the MICOM 10 decreases the RBS value by a predetermined level (step 138).

After carrying out the step 137 or the step 138, the MICOM 10 checks if the previous output logic state of the second comparator A2 stored in its RAM is equal to the present output logic state of the second comparator A2 received on the working buffer (step 139).

If the previous output logic state of the second comparator A2 is different from the present output logic state in the step 139, the MICOM 10 adds 1 to the value of its comparative change counter (step 140).

After the completion of the step 140, the MICOM 10 checks if the value of the comparative change counter is the predetermined value 5 (step 141).

If the value of the comparative change counter is 5 in the step 141, the MICOM 10 sets the B signal black set control mode flag (hereinafter, referred to as "BBS control mode flag") instead of the RBS control mode flag, thereby setting the B signal black control mode, the initializes the comparative change counter, and goes back to the step 119 (step 142).

And, if the output logic states of the second comparator A2 are not changed in the step 139 or if the value of the comparative change counter is not 5 in the step 141, the MICOM 10 goes back to the step 119.

If the RBS control mode flag has not been set in the step 131, the MICOM 10 checks if the BBS control mode flag has been set (step 143).

If the BBS control mode flag has been set in the step 143, the MICOM 10 waits until the vertical scanning pulse representing the vertical scanning term is received from the vertical synchronizing signal generator 80 (step 144).

If the vertical scanning pulse is received in the step 144, the MICOM 10 supplies the gain control signal GCS of a high logic state via the sixth control terminal CP6 to control the color signals supplied from the color signal processor 20 to be amplified by 18 dB greater than that of the normal time, and supplies a first control signal W of a low logic state and the second and third control signals X and Y of high logic states via the first, second and third control terminals CP1, CP2 and CP3 to control the first control switch 51 to select the second selection contact P2, and also to control the second and third control switches 52 and 53 to select the first selection contacts P1, respectively (step 145). At this time, the B signal, which is amplified by 18 dB greater than that at the normal time, is received in the inverted input terminal of the second comparator A2 through the first control switch 51, the first buffer 56, and the second and third control switches 52 and 53, and the first integrator 41.

After carrying out the step 145, the MICOM 10 waits until the vertical scanning pulse is again received from the vertical synchronizing signal generator 80 (step 146).

If the vertical synchronizing pulse is again received in the step 146, the MICOM 10 inverts the gain control signal GCS and the third control signal Y of high logic states to low logic states to make the color signals, i.e., an output of the color signal processor 2, have a normal gain, and makes the third control switch 53 select the second selection terminal P2 (step 147). At this time, the B signal having a normal gain is fed to the non-inverted input terminal of the second comparator A2 through the first control switch 51, the first buffer 55, the second and third control switches 52 and 53, and the second integrator 42.

After carrying out the step 147, the MICOM 10 checks if the output logic state of the second comparator A2 received from the second comparator A2 through the fourth control switch 54 and stored in its working buffer is a high logic state (step 148).

If the output logic state of the second comparator A2 is a high logic state in the step 148, the MICOM 10 increases the B signal black set value (hereinafter, referred to as "BBS value") stored in its RAM by a predetermined level (step 149).

If the output logic state of the second comparator A2 is not a high logic state in the step 149, the MICOM 10 decreases the BBS value by a predetermined level (step 150).

After carrying out the step 149 or 150, the MICOM 10 checks if the previous output logic state of the second comparator A2 stored in its RAM is equal to the present output logic state of the second comparator A2 fed to the working buffer (step 151).

If the previous output logic state of the second comparator A2 is different from the present output logic state, the MICOM 20 adds 1 to the value of its comparative change counter (step 152).

After carrying out the step 152, the MICOM 10 checks if the value of the comparative change counter is the predetermined value 5 (step 153).

If the value of the comparative change counter is 5 in the step 153, the MICOM 10 sets the R signal pedestal level control mode flag (hereinafter, "RP control mode flag") instead of the BBS control mode flag to set the R signal pedestal level control mode, and initializes the comparative change counter, and goes back to the step 119 (step 154). And, if the output logic state of the second comparator A2 is not changed in the step 151 or if the value of the comparative change counter is not 5 in the step 153, the MICOM 10 goes back to the step 119.

If the BBS control mode flag has not been set in the step 143, the MICOM 10 checks if the RP control mode flag has been set (step 155).

If the RP control mode flag has been set in the step 155, the MICOM 10 waits until the vertical scanning pulse is received from the vertical synchronizing signal generator 80 (step 156).

If the vertical scanning pulse is received in the step 156, the MICOM 10 supplies the second and third control signals of high logic states through the second and third control terminals CP2 and CP3, to control the second end third control switches 52 and 53 to select the first selection contacts, respectively (step 157). At this time, the G signal is supplied to the inverted input terminal of the second comparator A2 through the second buffer 56, the second and third control switches 52 and 53, and the first integrator 41.

After carrying out the step 157, the MICOM 10 waits until the vertical scanning pulse is again received from the vertical synchronizing signal generator 80 (step 158).

If the vertical scanning pulse is again received in the step 158, the MICOM 10 supplies the first control signal W of a high logic state and the second and third control signals X and Y of low logic states through the first to third control terminals CP1 to CP3, and controls the first control switch 51 to select the first selection contact P1, and the second and third control switches 52 and 53 to select the second selection contact P2, respectively (step 159). At this time, the R signal is supplied to the non-inverted input terminal of the second comparator A2 through the first control switch 51, the first buffer 55, the second and third control switches 52 and 53, and the second integrator 42.

After carrying out the step 159, the MICOM 10 checks if the output logic state of the second comparator A2 received through the fourth control switch 54 and stored in its working buffer is a high logic state (step 160).

If the output logic state of the second comparator A2 is a high logic state in the step 160, the MICOM 10 increases the R signal pedestal level value (hereinafter, referred to as "RP value") stored in its RAM by a predetermined level (step 161).

If the output logic state of the second comparator A2 is not a high logic state in the step 160, the MICOM 10 decreases the RP value by a predetermined level (step 162).

After carrying out the step 161 or 162, the MICOM 10 checks if the previous output logic state of the second comparator A2 stored in its RAM is equal to the present output logic state of the second comparator A2 fed to the working buffer (step 163).

If the previous output logic state of the second comparator A2 is different from the present logic state in the step 163, the MICOM 10 adds 1 to the value of its comparative change counter (step 164).

After carrying out the step 164, the MICOM 10 checks if the value of the comparative change counter is a predetermined value 5 (step 165).

If the value of the comparative change counter is 5 in step 165, the MICOM 10 sets the B signal pedestal level control mode (hereinafter, referred to as "BP control mode flag") instead of the RP control mode flag to set the B signal pedestal level control mode, and initializes the comparative change counter, and then goes back to the step 119 (step 166). And, if the output logic states of the second comparator A2 are not changed in the step 163 or if the value of the comparative change counter is not 5 in the step 165, the MICOM 10 goes back to the step 119.

If the RP control mode flag has not been set in the step 155, the MICOM 10 checks if the BP control mode flag has been set (step 167).

If the BP control mode flag has been set in the step 167, the MICOM 10 waits until the vertical scanning pulse is received from the vertical synchronizing signal generator 80 (step 168).

If the vertical scanning pulse is received in the step 168, the MICOM 10 supplies the second and third control signals of high logic states through the second and third control terminals CP2 and CP3, thereby controlling the second and third control switches 52 and 53 to select each first selection contact P1 (step 169). At this time, the G signal is supplied to the non-inverted terminal of the second comparator A2 through the second buffer 56, the second and third control switches 52 and 53, and the first integrator 41.

After carrying out the step 169, the MICOM 10 waits until the vertical scanning pulse is again received from the vertical synchronizing signal generator 80 (step 170).

If the vertical scanning pulse is again received in the step 170, the MICOM 10 supplies the first to third control signals W, X, and Y of low logic states through the first to third control terminals CP1 to CP3, to control the first to third control switches 51 to 53 to select each second selection contact P2 (step 171). At this time, the B signal is supplied to the non-inverted input terminal of the second comparator A2 through the first control switch 51 and the first buffer 55, the second and third control switches 52 and 53, and the second integrator 42.

After carrying out the step 171, the MICOM 10 checks if the output logic state of the second comparator A2 received through the fourth control switch 54 and stored in its working buffer is a high logic state (step 172).

If the output logic state of the second comparator A2 is a high logic state in the step 172, the MICOM 10 increases the B signal pedestal level value (hereinafter, referred to as "BP value") stored in its RAM by a predetermined level (step 173).

If the output logic state of the second comparator A2 is not a high logic state in the step 172, the MICOM 10 decreases the BP value by a predetermined level (step 174).

After carrying out the step 173 or 174, the MICOM 10 checks if the previous output logic state of the second comparator A2 stored in its RAM is equal to the present output logic state of the second comparator A2 received on the working buffer (step 175).

If the previous output logic state of the second comparator A2 is different from the present output logic state in the step 175, the MICOM 10 adds 1 to the value of its comparative change counter (step 176).

After carrying out the step 176, the MICOM 10 checks if the value of the comparator change counter is the predetermined value 5 (step 177).

If the value of the comparative change counter is 5 in the step 177, or if the BP control mode flag is not set in the step 167, the MICOM 10 initializes the ABB control mode flag and the comparative change counter, and goes back to the main routine (step 178). And, if the output logic states of the second comparator A2 are same in the step 175, or if the value of the comparative change counter is not 5 in the step 177, the MICOM 10 goes back to the step 119.

The MICOM 10 carries out the interrupt routine consisting of the steps 179 to 184, whenever the vertical blanking pulse representing the vertical blanking term is received from the vertical synchronizing signal generator 80.

When the vertical blanking pulse is received, the MICOM 10 checks if the AWB control mode flag is set, to determine whether the AWB control mode is set (step 179).

If the AWB control mode has not been set in the step 179, the MICOM 10 checks if the ABB control mode flag is set, to determine whether the ABB control mode is set (step 180).

If the AWB control mode has been set in the step 179 or if the ABB control mode has been set in the step 180, the MICOM 10 checks if an even/odd number vertical synchronizing signal display flag (hereinafter, "E/O vertical synchronizing display flag") allocated in its register is set, and determines if the present vertical synchronizing signal is an vertical synchronizing signal corresponding to an even number order (step 181).

If the present vertical synchronizing signal is an even order vertical synchronizing signal in the step 181, the MICOM 10 stores the output value of the first comparator A1 or the output value the second comparator A2, received in its working buffer via the fourth control switch 54, in its RAM and again receives the output value of the first comparator A1 or the second comparator A2 in the working buffer (step 182).

If the received vertical synchronizing signal is not the vertical synchronizing signal corresponding to an even number order in the step 181, or after the completion of the step 182, the value of the E/O vertical synchronizing display flag is inverted (step 183).

After carrying out the step 183, the MICOM 10 supplies the adjustable control data (i.e., one of the black level value, the black set value, and the pedestal level value) stored in its RAM, to the color signal processor 20 via the output device 60 to control the white balance and the black balance of color signals.

As described above, according to the present invention, the comparing device for white balance and the comparing device for black balance are provided, and the signals received in two comparing means are properly transmitted, so that the white balance control and the black balance control can be carried out in common, and the circuit constitution can be simplified.

What is claimed is:

1. A compatible circuit for controlling automatic white balance and automatic black balance of video signals, comprising:

a controller for controlling an automatic white balance and an automatic black balance of said video signals having a plurality of color signals;

a color signal processor responsive to said controller, for providing selected signals by variably amplifying and processing said plurality of color signals;

first comparing means responsive to said controller, for providing first comparison signals by comparing first said selected signals processed by said color signal processor to control said automatic white balance of said video signal;

second comparing means responsive to said controller, for providing second comparison signals by comparing second said selected signals processed by said color signal processor to control said automatic black balance of said video signal;

transit means for selectively supplying said selected signals processed in said color signal processor under the control of said controller to the first and second comparing means, and selectively transmitting said first and second comparison signals to said controller;

means for supplying white correction data and black correction data processed by said controller to said color signal processor for controlling said automatic white balance and said automatic black balance of said video signal;

key input means for transmitting a user's command signal to enable said controller to control said automatic white balance and said automatic black balance of said video signal; and vertical synchronizing signal generator means for supplying a vertical synchronizing signal to said controller to enable said controller to control said automatic white balance and said black balance of said video signal.

2. The circuit of claim 1, wherein said transit means comprises:

first buffer means for selectively enabling transmission of said selected signals representative of a red color signal and a blue color signal to provide a first intermediate signal in response to a first control signal generated from said controller; and second buffer means for enabling transmission of said selected signals representative of a green color signal to provide a second intermediate signal in response to a second control signal generated from said controller.

3. The circuit of claim 2, wherein said first comparing means comprises:

first sampling means coupled to receive said first intermediate signal for sampling said first intermediate signal to provide a first sampled signal in dependence upon reception of a reset signal generated from said controller;

second sampling means coupled to receive said second intermediate signal for sampling said second intermediate signal to provide a second sampled signal in dependence upon reception of said reset signal; and a first comparator having a non-inverting terminal coupled to receive said first sampled signal and an inverting terminal coupled to receive said second sampled signal, for comparing said first and second sampled signals to provide an automatic white balance signal to said controller.

4. The circuit of claim 2, wherein said second comparing means comprises:

first integrator means coupled to provide a first integrated signal by integrating one of said first intermediate signal and said second intermediate signal in response to a second control signal generated from said controller;

second integrator means coupled to provide a second integrated signal by integrating one of said first intermediate signal and said second intermediate signal in response to said second control signal; and a second comparator having a non-inverting terminal coupled to receive said first integrated signal and an inverting terminal coupled to receive said second integrated signal, for comparing said first and second integrated signals to provide an automatic black balance signal to said controller.

5. The circuit of claim 3, wherein said second comparing means comprises:

first integrator means coupled to provide a first integrated signal by integrating one of said first intermediate signal and said second intermediate signal in response to a second control signal generated from said controller;

second integrator means coupled to provide a second integrated signal by integrating one of said first intermediate signal and said second intermediate signal in response to said second control signal; and a second comparator means having a non-inverting terminal coupled to receive said first integrated signal and an inverting terminal coupled to receive said second integrated signal, for comparing said first and second integrated signals to provide an automatic black balance signal to said controller.

6. A method for controlling an automatic white balance and automatic black balance, comprising steps of:

checking whether a user requires an automatic white balance control or an automatic black balance control;

controlling a white level balance of color signals by detecting a level difference between color signals or every other vertical synchronizing period, when said automatic white balance control is required;

controlling a color signal black set value for each color signal by reading a difference between pedestal levels of each color signal during a first time period and during a gain increasing time period at every other vertical synchronizing period, and for controlling a pedestal level balance of said color signals by reading a difference between pedestal levels of color signals at every other vertical synchronizing period, which automatic black balance control is required; and producing control data during said automatic black balance control sequence at every other vertical synchronizing period.

7. A circuit for controlling automatic white balance and automatic black balance of a video signal, comprising:

controller means for controlling an automatic white balance and an automatic black balance of said video signal representative of a plurality of color signals in dependence upon reception of a command signal corresponding to one of said automatic white balance and said automatic black balance, and a vertical synchronizing signal;

processor means responsive to said controller means, for variably amplifying and processing said plurality of color signals;

transit means responsive to said controller means, for selectively enabling transmission of first selected signals and said second selected signals from among said plurality of color signals from said processor means;

first comparing means coupled to receive said first selected signals from said transit means, for comparing said first selected signals to enable said controller means to control said automatic white balance of said video signals; and second comparing means coupled to receive said second selected signals from said transit means, for comparing said second selected signals to enable said controller means to control said automatic black balance of said video signal.

8. The circuit of claim 7, wherein said transit means comprises:

first buffer means for selectively enabling transmission of said first and second selected signals representative of a red color signal and a blue color signal to provide a first intermediate signal in response to a first control signal generated from said controller means; and second buffer means for enabling transmission of said first and second selected signals representative of a green color signal to provide a second intermediate signal in response to a second control signal generated from said controller means.

9. The circuit of claim 8, wherein said first comparing means comprises:

first sampling means coupled to receive said first intermediate signal for sampling said first intermediate signal to provide a first sampled signal in dependence upon reception of a reset signal generated from said controller means;

second sampling means coupled to receive said second intermediate signal for sampling said second intermediate signal to provide a second sampled signal in dependence upon reception of said reset signal; and a first comparator having a non-inverting terminal coupled to receive said first sampled signal and an inverting terminal coupled to receive said second sampled signal, and comparing said first and second sampled signals to provide an automatic white balance signal to said controller means.

10. The circuit of claim 8, wherein said second comparing means comprises:

first integrator means coupled to provide a first integrated signal by integrating one of said first intermediate signal and said second intermediate signal in response to a second control signal generated from said controller means;

second integrator means coupled to provide a second integrated signal by integrating one of said first intermediate signal and said second intermediate signal in response to said second control signal; and a second comparator having a non-inverting terminal coupled to receive said first integrated signal and an inverting terminal coupled to receive said second integrated signal, for comparing said first and second integrated signals to provide an automatic black balance signal to said controller means.

11. The circuit of claim 9, wherein said second comparing means comprises:

first integrator means coupled to provide a first integrated signal by integrating one of said first intermediate signal and said second intermediate signal in response to a second control signal generated from said controller means;

second integrator means coupled to provide a second integrated signal by integrating one of said first intermediate signal and said second intermediate signal in response to said control signal; and a second comparator having a non-inverting terminal coupled to receive said first integrated signal and an inverting couple to receive said second integrated signal, for comparing said first and second integrated signals to provide an automatic black balance signal to said controller means.

12. A circuit for automatic balance controlling of a pedestal level and an amplitude level of a video signal, comprising:

controller means for generating a plurality of control signals in dependence upon reception of a command signal to control a pedestal level representative of automatic black balance and an amplitude level representative of an automatic white balance of a video signal by providing black correction data and white correction data to said video signal, said plurality of control signals comprising of at least first, second, third, and fourth control signals and a reset signal;

processor means coupled to receive said video signal representative by a plurality of color signals, for processing said plurality of color signals in dependence upon said black correction data and said white correction data, said plurality of color signals being representative by a red signal, a blue signal, and a green signal;

first switch means for enabling transmission of one of said red signal and said blue signal in dependence upon reception of said first control signal to provide a first intermediate signal representative of one of said red signal and said blue signal;

buffer means for buffering said first intermediate signal to provide a first buffered signal, and for buffering said green signal to provide a second buffered signal;

first comparing means coupled to receive said first and second buffered signals, for sampling each of said first and second buffered signals in dependence upon reception of said reset signal to respectively provide first and second sampled signals, for providing a first comparison signal by comparing said first and second sampled signals to control said white correction data;

second switch means for enabling transmission of one of said first buffered signal and said second buffered signal in dependence upon reception of said second control signal to provide a second intermediate signal representative of one of said first buffered signal and said second buffered signal; and second comparing means having first and second integrator circuits coupled to alternatively receive said second intermediate signal representative of one of said first and second buffered signal in dependence upon reception of said third control signal, for integrating said second intermediate signal to provide first and second integrated signals, and for providing a second comparison signal by comparing said first and second integrated signals to control said black correction data.

13. The circuit of claim 12, wherein said first comparing means comprises:

first sampling means coupled to receive said first buffered signal, for sampling said first buffered signal to provide said first sampled signal in dependence upon reception of said reset signal;

second sampling means coupled to receive said second buffered signal, for sampling said second buffered signal to provide said second sampled signal in dependence upon reception of said reset signal; and a first comparator having a non-inverting terminal coupled to receive said first sampled signal and an inverting terminal coupled to receive said second sampled signal, for comparing said first and second sampled signals to provide an automatic white balance signal to said controller means for providing said white correction data to control the amplitude level of said video signal.

14. The circuit of claim 12, wherein said second comparing means comprises:

first integrator means coupled to receive said second intermediate signal representative of one of said first buffered signal and said second buffered signal, for integrating said second intermediate signal to provide said first integrated signal in dependence upon reception of said third control signal;

second integrator means coupled to receive said second intermediate signal, for integrating said second intermediate signal to provide said second intermediate signal in dependence upon reception of said third control signal; and a second comparator having a non-inverting terminal coupled to receive said first integrated signal and an inverting terminal coupled to receive said second integrated signal, for comparing said first and second integrated signals to provide an automatic black balance signal to said controller means for providing said black correction data to control the pedestal level of said video signal.

15. The circuit of claim 12, wherein said controller means checks said first comparison signal and said second comparison signal in response to a period of vertical synchronizing signals to provide said black correction data and said white correction data to said processor means for correcting the pedestal level and the amplitude level of said plurality of color signals.

* * * * *

UNITED STATES PATENT AND TRADEMARK OFFICE
CERTIFICATE OF CORRECTION

PATENT NO. : 5,164,820
DATED : November 17, 1992
INVENTOR(S) : Byeong-Kwan Jeon, et al.

It is certified that error appears in the above-indentified patent and that said Letters Patent is hereby corrected as shown below:

Column 2   Line 7, change "comprising" to --comparing--;

Line 42 and 44, change "device" to --devices--;

Claim 6   Column 15, Line 41, change "or" to --at--:

Signed and Sealed this

Eighteenth Day of February, 1997

Attest:

BRUCE LEHMAN

*Attesting Officer*   *Commissioner of Patents and Trademarks*